United States Patent
Yuan et al.

(10) Patent No.: US 12,524,688 B2
(45) Date of Patent: Jan. 13, 2026

(54) METHOD, DEVICE AND STORAGE MEDIUM FOR RUNNING INFERENCE SERVICE PLATFORM

(71) Applicant: BEIJING BAIDU NETCOM SCIENCE TECHNOLOGY CO., LTD., Beijing (CN)

(72) Inventors: Zhengxiong Yuan, Beijing (CN); Zhengyu Qian, Beijing (CN); En Shi, Beijing (CN); Mingren Hu, Beijing (CN); Jinqi Li, Beijing (CN); Zhenfang Chu, Beijing (CN); Runqing Li, Beijing (CN); Yue Huang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 834 days.

(21) Appl. No.: 17/817,015

(22) Filed: Aug. 3, 2022

(65) Prior Publication Data

US 2022/0374742 A1 Nov. 24, 2022

(30) Foreign Application Priority Data

Aug. 4, 2021 (CN) .......................... 202110892636.1

(51) Int. Cl.
  *G06F 3/00* (2006.01)
  *G06F 9/48* (2006.01)
  *G06N 5/04* (2023.01)

(52) U.S. Cl.
  CPC ............. *G06N 5/04* (2013.01); *G06F 9/4881* (2013.01)

(58) Field of Classification Search
  CPC ....................................................... G06F 9/455
  See application file for complete search history.

(56) References Cited

U.S. PATENT DOCUMENTS 8,799,623 B2 * 8/2014 Cambonie ............ G06F 15/803
  712/15
10,810,051 B1 * 10/2020 Shankar ................ G06F 9/5022
(Continued)

FOREIGN PATENT DOCUMENTS

CN    109951566 A    6/2019
CN    110888722 A    3/2020
(Continued)

OTHER PUBLICATIONS

Marum Simão Filho, Task Allocation in Distributed Software Development: A Systematic Literature Review. (Year: 2018).*
(Continued)

*Primary Examiner* — Lechi Truong
(74) *Attorney, Agent, or Firm* — Osha Bergman Watanabe & Burton LLP

(57) ABSTRACT

A method for running an inference service platform, includes: determining inference tasks to be allocated for the inference service platform, in which the inference service platform includes two or more inference service groups, versions of the inference service groups are different, and the inference service groups are configured to perform a same type of inference services; determining a flow weight of each of the inference service groups, in which the flow weight is configured to indicate a proportion of a number of inference tasks to which the corresponding inference service group need to be allocated in a total number of inference tasks; and allocating the corresponding number of inference tasks in the inference tasks to be allocated to each of the inference service groups based on the flow weight of each of the inference service groups; and performing the inference tasks by the inference service group.

17 Claims, 4 Drawing Sheets

(56) References Cited

U.S. PATENT DOCUMENTS

| 2015/0236974 A1 | 8/2015 | Minamitake et al. |
| 2018/0007126 A1* | 1/2018 | Borst et al. |
| 2020/0233706 A1* | 7/2020 | Smith .................. G06F 9/5066 |
| 2022/0223285 A1* | 7/2022 | Hirsch .................. G06T 7/0012 |

FOREIGN PATENT DOCUMENTS

| CN | 111343235 A | 6/2020 |
| CN | 111461332 A | 7/2020 |
| CN | 111625245 A | 9/2020 |
| CN | 111782185 A | 10/2020 |

OTHER PUBLICATIONS

Search Report for issued for corresponding European patent application No. 22188822.5, mailed Dec. 6, 2022 (10 pages).
Yossi Azar, "On-line Load Balancing," Electronic Publishing, Artistic Imaging, and Digital Typography; [Lecture Notes in Computer Science, ISSN 0302-9743], Springer Verlag, DE, Jan. 1, 1998, pp. 178-195, XP000949006 (18 pages).
Office Action issued for corresponding Chinese patent application No. 202110892636.1, mailed on Mar. 10, 2022 (18 pages).
Second Office Action issued for corresponding patent application No. 202110892636.1 (27 pages).

* cited by examiner

METHOD, DEVICE AND STORAGE MEDIUM FOR RUNNING INFERENCE SERVICE PLATFORM

CROSS-REFERENCE TO RELATED APPLICATION

This application claims priority to Chinese Patent Application No. 202110892636.1, filed on Aug. 4, 2021, the entire content of which is incorporated herein by reference for all purpose.

TECHNICAL FIELD

The disclosure relates to the field of artificial intelligence, particularly to the field of inference services of artificial intelligence models, and specifically to a method for running an inference service platform, a device and a storage medium.

BACKGROUND

With applications of artificial intelligence technologies in various industries, challenges for artificial intelligence inference services in complex and diverse service application scenes are presented. Services may require the effect of artificial intelligence models to be continuously optimized, so that version iterations of artificial intelligence models in production environments change more frequently.

SUMMARY

According to one aspect of the disclosure, a method for running an inference service platform is provided, and includes: determining inference tasks to be allocated for the inference service platform, in which the inference service platform includes two or more inference service groups, versions of the inference service groups are different, and the inference service groups are configured to perform a same type of inference services; determining a flow weight of each of the inference service groups, in which the flow weight is configured to indicate a proportion of a number of inference tasks to which the corresponding inference service group need to be allocated in a total number of inference tasks; allocating the corresponding number of inference tasks in the inference tasks to be allocated to each of the inference service groups based on the flow weight of each of the inference service groups; and performing the inference tasks by the inference service group.

According to another aspect of the disclosure, an electronic device is provided, and includes: at least one processor; and a memory communicatively connected to the at least one processor; in which the memory is configured to store instructions executable by the at least one processor, and when the instructions are performed by the at least one processor, the at least one processor is caused to perform the method for running an inference service platform described above.

According to another aspect of the disclosure, a non-transitory computer readable storage medium stored with computer instructions is provided. The computer instructions are configured to cause a computer to perform the method for running an inference service platform described above.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

Embodiments of the disclosure are described as below with reference to the accompanying drawings, which include various details of embodiments of the disclosure to facilitate understanding, and should be considered as merely exemplary. Therefore, those skilled in the art should realize that various changes and modifications may be made to the embodiments described herein without departing from the scope and spirit of the disclosure. Similarly, for clarity and conciseness, description of well-known functions and structures may be omitted in the following description.

In the related art, multiple versions of the same artificial intelligence model are respectively applied to multiple independent inference service groups, and a user (for example, a model developer) needs to allocate multiple inference tasks to different versions of inference service groups, with a large workload and low efficiency. The method and the apparatus for running an inference service platform, the device and the storage medium provided in some embodiments of the disclosure are intended to solve at least one of the technical problems in the related art.

Figure 1:
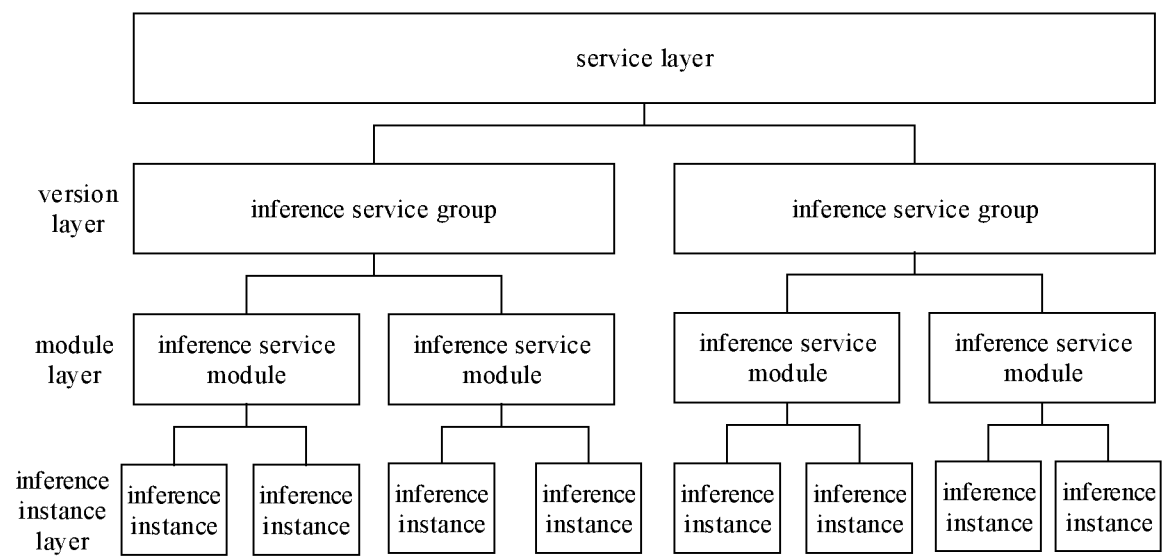
FIG. 1 illustrates an architecture diagram of a method for running an inference service platform provided in some embodiments of the disclosure.

An inference service platform is provided in some embodiments of the disclosure. FIG. 1 illustrates an architecture diagram of a method for running an inference service platform provided in some embodiments of the disclosure. As illustrated in FIG. 1, the inference service platform adopts a layered structure, and includes a service layer, a version layer, a module layer and an inference instance layer. Association and synchronization among layers are controlled by corresponding modules.

The service layer is configured to define overall meta information, overall specification and real-time state of the inference service platform.

In detail, the overall meta information may include the following information: service name: a unique identifier of the inference service platform; service address: an invoke address of the inference service platform for external access; service creation time: creation time of the inference service platform, represented by a timestamp; service specification version: modification times of versions of the inference service groups in the inference service platform; space where service belongs to: each tenant corresponds to one space in a multi-tenant scene.

The service specification may include the following information: route type: defining matching manners of route forwarding, including absolute matching, prefix matching and regular matching; route address: defining a backend address corresponding to the inference service platform; version meta information: meta information of the inference service group, which will be discussed in detail in the version layer.

The real-time state may include the following information: service state: indicating whether the inference service platform is in a runnable state; recent invoking time of service: the last invoking time of the inference service platform, which is represented by a timestamp; service invoking amount: the invoking number since the inference service platform is created; service QPS: the quantity of processed requests per second on the current inference service platform.

The version layer under the service layer contains one or more versions of inference service groups, the version layer is configured to define meta information of each version of the inference service group, and the meta information includes a name, a flow weight, and the like of the version of the inference service group. A route control module acts between the service layer and the version layer, and supports setting an inference task distribution policy for versions of inference service groups.

The meta information of each version of the inference service group may include the following information: version name: a unique identifier of the inference service group on the inference service platform; version creation time: creation time of the inference service platform, represented by a timestamp; the flow weight of the inference service platform: a flow ratio of forwarded to the inference service group, the range being an integer ranging from 0 to 100, and a sum of the flow weights of all versions of inference service groups being 100, in which it may be understood that the flow weight may indicate a proportion of the number of inference tasks that the inference service group needs to be allocated in the total number of inference tasks; meta information of the inference service module: meta information at the module level is discussed in detail in the module layer.

The module layer under the version layer includes a plurality of inference service modules in each inference service group, and the module layer defines meta information of each inference service module, and the meta information includes a name of the inference service module, the number of inference instances included in the inference service module, etc.

Different inference service modules in the same inference service group are correspondingly configured to perform different subtasks in the inference service. Assuming that the inference service that the inference service group is configured to perform is "recognizing a note number in a note", the inference service group may include two inference service modules, one is configured to recognize a target area containing the note number in the note, and the other is configured to recognize the note number in the target area.

The meta information of the inference service module may include the following information: module name: a unique identifier of the inference service module under the version of the inference service group; number of inference instances: the number of inference instances included in the inference service module, in which all inference instances of one inference service module are the same; first identifier of the inference service module: which is configured to indicate an arrangement order of the corresponding inference service module, in which the service address is generated based on the first identifier corresponding to the inference service module; specification configuration information of inference instances: which will be discussed in the inference instance layer.

The inference instance layer includes a plurality of inference instances in each inference service module, and defines a series of specification configuration information required by initiating the inference instance, the configuration information including a deployment package address, a start command, an open port, an interface protocol, computing resources used, and the like. An inference instance management module that matches the inference instance layer may control a start-up mode, a sounding mechanism, or the like of a control inference instance process.

In some embodiments of the disclosure, optionally, each inference instance in one inference service module is exactly the same, and is configured to perform the same subtask, and the inference instance is formed by encapsulating a trained model and a run code of the model. For example, the inference service module for recognizing the target area containing the note number in the note may include a plurality of inference instances, the inference instance being formed by encapsulating the trained model and the run code of the model, the model being configured to recognize the target area containing the note number in the note.

The specification configuration information of the inference instance may include the following information: inference instance name: a unique identifier of the inference instance in the inference service module; address: a deployment package address of starting the inference instance; startup command: inference instance startup command; environmental variables: environmental variables required by starting the inference instance; open port: a port monitored by the inference instance, configured for routing forwarding access; interface protocol: an interface protocol used by the inference instance, such as HTTP and TCP; sounding mode and configuration: interface or script configuration of inference instance sounding; computing power resources: computing resources required by starting the inference instance, including resource information such as an internal storage, a CPU core number, a GPU computing power, and a video memory; storage resources: external storages required by starting the inference instance, including object storage, file storage, etc.; other specification parameters: a preparation script before starting the inference instance, a post script before destroying the inference instance, etc.

Figure 2:
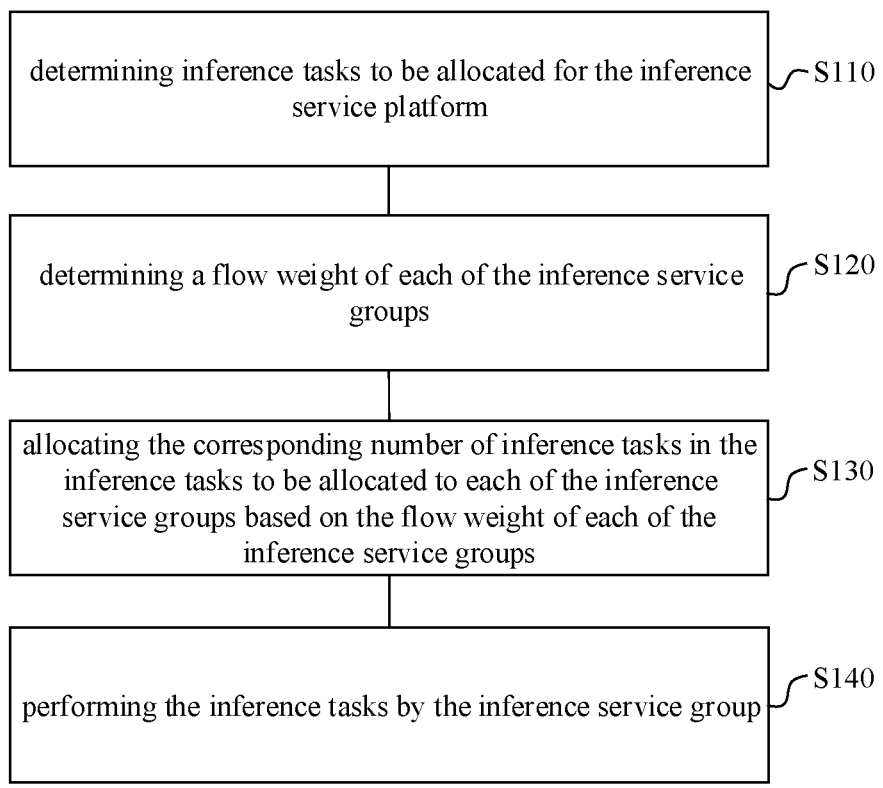
FIG. 2 illustrates a flow diagram of a method for running an inference service platform provided in some embodiments of the disclosure.

FIG. 2 illustrates a flow diagram of a method for running an inference service platform provided in some embodiments of the disclosure. As illustrated in FIG. 2, the method mainly may include the following.

At S110, inference tasks to be allocated for the inference service platform are determined.

In some embodiments of the disclosure, the inference service platform includes two or more inference service groups, versions of the inference service groups are different, and the inference service groups are configured to perform the same type of inference services. For example, the service platform includes two inference service groups, one inference service group is an initial version, another inference service group is a latest version, and the inference service the two inference service groups are configured to perform is "recognizing a note number in a note".

In some embodiments of the disclosure, the inference task sent to the inference service platform may be cached in a task queue, and a corresponding trigger condition may be configured to determine the inference tasks to be allocated from the task queue.

Optionally, inference tasks in a task queue of the inference service platform may be determined as the inference tasks to be allocated in response to a number of tasks in the task queue reaching a preset number. The value of the preset number may be determined based on the actual requirement, for example, the preset number is 100. When the number of inference tasks in the task queue of the inference service platform is 100, the 100 inference tasks are determined as the inference tasks to be allocated.

Optionally, for every preset time period, inference tasks stored in a task queue of the inference service platform in the preset time period may be determined as the inference tasks to be allocated. The value of the preset time period may be determined based on the actual requirement, for example, the preset time period is 100 s. For every 100 s, the inference tasks stored in the task queue of the inference service platform within 100 s may be determined as the inference tasks to be allocated.

At S120, a flow weight of each of the inference service groups is determined.

In some embodiments of the disclosure, the flow weight is configured to indicate a proportion of a number of inference tasks to which the corresponding inference service group need to be allocated in a total number of inference tasks. Optionally, the flow weight of each inference service group is any integer between 0 and 100, and the sum of flow weights of all versions of inference service groups is 100. For example, the service platform includes two inference service groups, the flow weight of one inference service group is 40, and the flow weight of the other inference service group is 60. In this case, the proportions of the number of inference tasks the two inference service groups need to be allocated to the total number of inference tasks are respectively 0.4 and 0.6. Optionally, the flow weight may be preconfigured by a user, or randomly generated, or determined based on the parameters of the inference service group (for example, specification configuration information or other specification parameters), which are not limited in the disclosure.

Preferably, in some embodiments of the disclosure, the flow weight of each of the inference service groups may be configured in response to a weight configuration operation for each of the inference service groups; and identification information of each of the inference service groups and the corresponding flow weight may be associatively recorded. Specifically, in some embodiments of the disclosure, a user is allowed to configure the flow weight of each of the inference service groups, for example, the user may correspondingly configure the flow weights of two inference service groups in the inference service platform as 40 and 60, and associatively record the flow weight configured by the user for each inference service group and identification information of the inference service group. The identification information may be a unique identifier of the inference service group under the inference service platform. The user may configure the flow weight of each inference service group based on the actual requirement, so that the inference service platform may quickly satisfy the real-time requirements of the user.

In some embodiments of the disclosure, a service scene corresponding to the inference service platform is determined, and the flow weight of each of the inference service groups is determined based on a type of the service scene. The type of the service scene includes an effect verification scene of the inference service groups or a version update scene of the inference service groups. The flow weight of each of the inference service groups corresponding to each type of service scene is preconfigured.

Optionally, the user may correspondingly configure the flow weights of inference service groups in the inference service platform for each type of service scene. For example, taking the inference service platform includes two inference service groups for an example, for the effect verification scene of the inference service groups, the user may correspondingly configure the flow weights of two inference service groups in the inference service platform as 80 and 20, in which, the flow weight of the original version of inference service group is 80, and the flow weight of the new version of inference service group is 20.

For the version update scene of the inference service groups, the user may correspondingly configure the flow weights of two inference service groups in the inference service platform as 50 and 50.

At S130, the corresponding number of inference tasks in the inference tasks to be allocated are allocated to each of the inference service groups based on the flow weight of each of the inference service groups.

As described above, the flow weight of the inference service group is configured to indicate the proportion of the number of inference tasks to which the corresponding inference service group need to be allocated to the total number of inference tasks. Optionally, the flow weight of each inference service group is any integer between 0 and 100, and the sum of flow weights of all versions of inference service groups is 100. For example, the service platform includes two inference service groups, the flow weight of one inference service group is 40, and the flow weight of the other inference service group is 60. In this case, the proportions of the number of inference tasks the two inference service groups need to be allocated to the total number of inference tasks are respectively 0.4 and 0.6. When the total number of the inference tasks to be allocated is 200, the 200 inference tasks need to be divided into two groups based on the proportion of 2:3 (that is, 0.4:0.6), in which, one group includes 80 inference tasks, and the other includes 120 inference tasks, the 80 inference tasks are allocated to the inference service group with the flow weight of 40, and the 120 inference tasks are allocated to the inference service group with the flow weight of 60.

At S140, the inference tasks are performed by the inference service group.

In some embodiments, the inference service group includes inference service modules, different inference service modules are correspondingly configured to perform different subtasks in the inference service. When inference tasks are performed by the inference service group, specifically, different inference service modules in the inference service group are correspondingly configured to perform different subtasks in the inference service.

Assuming that the inference service the inference service group is configured to perform is "recognizing a note number in a note", the inference service group may include two inference service modules, one is configured to recognize a target area containing the note number in the note, and the other is configured to recognize the note number in the target area.

In the method for running an inference service platform provided in some embodiments of the disclosure, different versions of inference service groups are deployed in the same inference service platform, to automatically allocate the corresponding number of inference tasks for each inference service group, which greatly reduces the workload of the user which is added due to allocating tasks for the inference service group and improves the working efficiency of the inference service.

Figure 3:
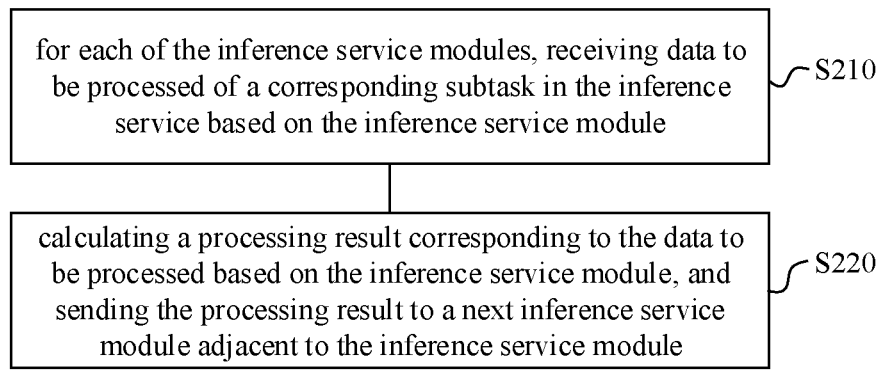
FIG. 3 illustrates a flow diagram where an inference service group performs an inference task provided in some embodiments of the disclosure.

In addition, it is found that, in the related art, for the inference service group including different inference service modules, the inference service modules in the inference service group need to be arranged based on a DAG (directed acyclic graph), and a center scheduling module needs to be configured in a platform to connect the subtasks of the inference service modules in series, which may lead to the high transformation cost of interface adaptation development of the center scheduling module, high system complexity and high single point bearing risk. Based on the above reason, an implementation the inference service group performs inference tasks is provided in the disclosure. FIG. 3 illustrates a flow diagram where an inference service group performs inference tasks provided in some embodiments of the disclosure. As illustrated in FIG. 3, the flow mainly may include the following.

At S210, for each of the inference service modules, data to be processed of a corresponding subtask in the inference service is received based on the inference service module.

The data to be processed is a processing result generated by a previous inference service module adjacent to the inference service module, or original data of a first subtask in the inference service. In some embodiments, one inference task may include multiple subtasks that need to be completed in sequence, the inference service group includes inference service modules, and different inference service modules are correspondingly configured to perform different subtasks in the inference service. For an inference service module configured to perform the first subtask, the data to be processed of the subtask received is the original data of the first subtask in the inference service; for an inference service module configured to perform other subtask other than the first subtask, the data to be processed of the subtask received is the processing result generated by the adjacent previous inference service module, for example, the data to be processed of the subtask received by the inference service module configured to perform the second subtask is the processing result generated by the inference service module configured to perform the first subtask.

At S220, a processing result corresponding to the data to be processed is calculated based on the inference service module, and sent to a next inference service module adjacent to the inference service module.

It may be understood that, for the inference service module configured to perform the first subtask, when the processing result corresponding to the data to be processed of the first subtask is calculated, the processing result may be sent to the inference service module configured to perform the second subtask, and so on. In some embodiments of the disclosure, the inference service module configured to perform the first subtask may be configured as a module of data input and output in the inference service group, and for the inference service module configured to perform the last subtask, when a final processing result corresponding to the data to be processed of the last subtask is calculated, the final processing result may be sent to the inference service module configured to perform the first subtask, and output by the inference service module configured to perform the first subtask.

Optionally, each of the inference service modules has a first identifier configured to indicate an arrangement order corresponding to the inference service module. In some embodiments of the disclosure, a service address of each of the inference service modules may be generated based on the first identifier corresponding to each of the inference service modules, to ensure the uniqueness of the service address of each of the inference service modules, and the data may be sent to each of the inference service modules through the service address of each of the inference service modules.

In some embodiments of the disclosure, the service address of each of the inference service modules may be pre-stored in other inference service modules. For example, one inference service group includes 5 inference service modules, respectively an inference service module a, an inference service module b, an inference service module c, an inference service module d, and an inference service module e. Taking the inference service module a for an example, the service addresses of the inference service module b, the inference service module c, the inference service module d, and the inference service module e as environmental variables may be stored in the inference service module a, and the service address that needs to be stored by other interference modules may refer to the inference service module a, which will not be repeated herein.

In some embodiments of the disclosure, for an inference service module configured to perform a subtask, the service address of the next inference service module adjacent to the inference service module may be determined from the inference service modules, and the processing result corresponding to the data to be processed of the subtask calculated may be sent to the next inference service module through the service address. For example, for the inference service module configured to perform the first subtask, the service address of the inference service module configured to perform the second subtask is determined from the inference service modules, and when the processing result corresponding to the data to be processed of the first subtask is calculated, the processing result may be sent to the inference service module configured to perform the second subtask through the service address.

In some embodiments of the disclosure, one inference service module may send the processing result to the next inference service module adjacent to the inference service module, that is, model arrangement may be achieved via direct communication between each inference service module, which may omit the center scheduling module, and effectively avoids the high transformation cost of interface adaptation development, high system complexity and high single point bearing risk in the model arrangement manner based on the center scheduling module.

Figure 4:
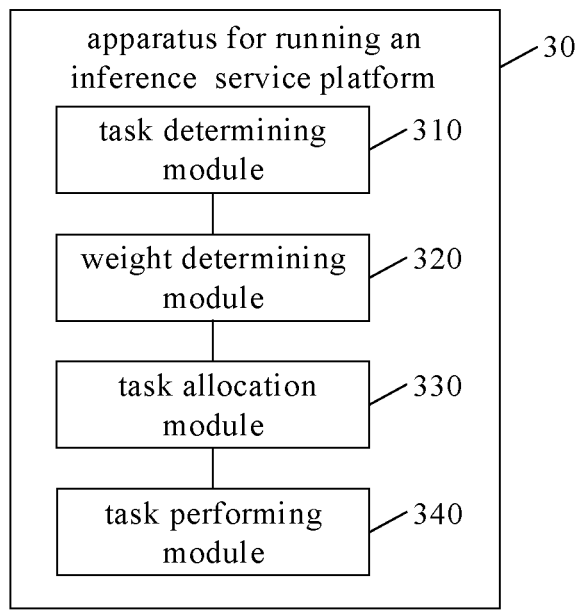
FIG. 4 illustrates a block diagram of an apparatus for running an inference service platform provided in some embodiments of the disclosure.
Figure 5:
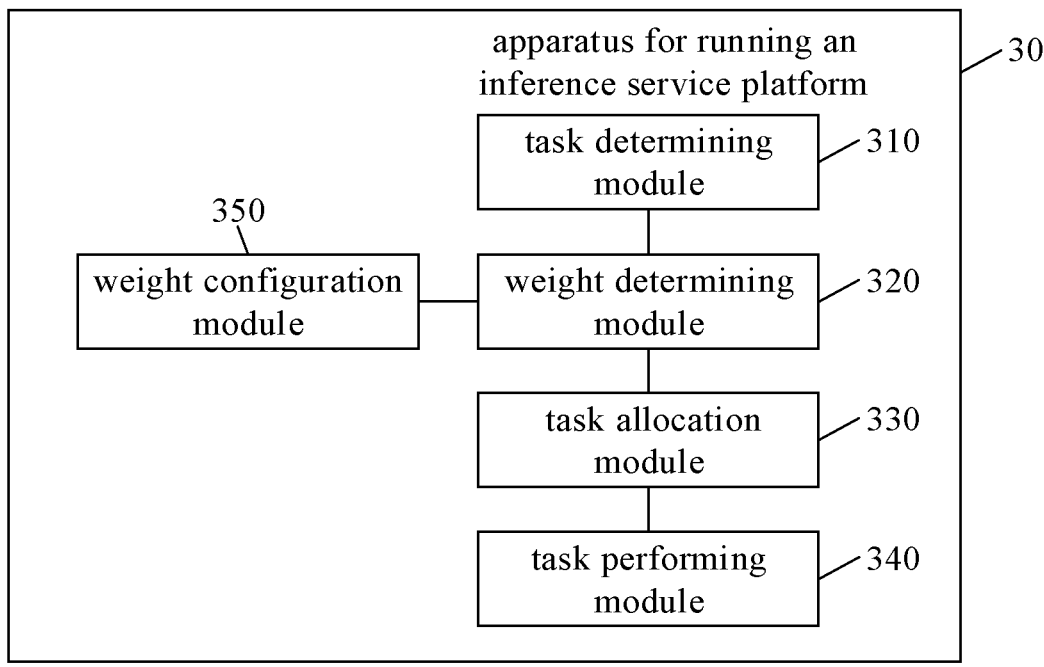
FIG. 5 illustrates a block diagram of an apparatus for running an inference service platform provided in some embodiments of the disclosure.

Based on the same principle of the method for running an inference service platform, FIG. 4 illustrates a block diagram of an apparatus for running an inference service platform provided in some embodiments of the disclosure, and FIG. 5 illustrates a block diagram of an apparatus for running an inference service platform provided in some embodiments of the disclosure. As illustrated in FIG. 4, the apparatus 30 for running an inference service platform includes a task determining module 310, a weight determining module 320, a task allocation module 330 and a task performing module 340.

The task determining module 310 is configured to determine inference tasks to be allocated for the inference service platform, in which the inference service platform includes two or more inference service groups, versions of the inference service groups are different, and the inference service groups are configured to perform the same type of inference services.

The weight determining module 320 is configured to determine a flow weight of each of the inference service groups, the flow weight is configured to indicate a proportion of a number of inference tasks to which the corresponding inference service group need to be allocated in a total number of inference tasks.

The task allocation module 330 is configured to allocate the corresponding number of inference tasks in the inference tasks to be allocated to each of the inference service groups based on the flow weight of each of the inference service groups.

The task performing module 340 is configured to perform the inference tasks by the inference service group.

In the apparatus for running an inference service platform provided in some embodiments of the disclosure, different versions of inference service groups are deployed in the same inference service platform, to automatically allocate the corresponding number of inference tasks for each inference service group, which greatly reduces the workload of the user which is added due to allocating tasks for the inference service group and improves the working efficiency of the inference service.

In some embodiments of the disclosure, the task determining module 310 is configured to determine the inference tasks to be allocated for the inference service platform by: determining inference tasks in a task queue of the inference service platform as the inference tasks to be allocated in response to a number of tasks in the task queue reaching a preset number; or, for every preset time period, determining inference tasks stored in a task queue of the inference service platform in the preset time period as the inference tasks to be allocated.

In some embodiments of the disclosure, the weight determining module 320 is configured to determine the flow weight of each of the inference service groups by: determining a service scene corresponding to the inference service platform; and determining the flow weight of each of the inference service groups based on a type of the service scene, in which the type of the service scene includes an effect verification scene of the interference service groups, or a version update scene of the interference service group. The flow weight of each of the inference service groups is determined based on the type of the service scene, and the flow weight of each of the inference service groups corresponding to each type of service scene is preconfigured.

In some embodiments, as illustrated in FIG. 5, the apparatus 30 for running an inference service platform further includes a weight configuration module 350. The weight configuration module 350 is configured to: configure the flow weight of each of the inference service groups in response to a weight configuration operation for each of the inference service groups; and associatively record identification information of each of the inference service groups and the corresponding flow weight.

In some embodiments, the inference service group includes inference service modules, different inference service modules are correspondingly configured to perform different subtasks in the inference service; and the task performing module 340 is configured to perform the inference tasks by the inference service module group by: for each of the inference service modules: receiving data to be processed of a corresponding subtask in the inference service based on the inference service module, in which, the data to be processed is a processing result generated by a previous inference service module adjacent to the inference service module, or original data of a first subtask in the inference service; and calculating a processing result corresponding to the data to be processed based on the inference service module, and sending the processing result to a next inference service module adjacent to the inference service module.

In some embodiments, the task performing module 340 is configured to send the processing result to the next inference service module adjacent to the inference service module, by: determining a service address of the next inference service module adjacent to the inference service module from the inference service modules, wherein, a service address of each of the inference service modules is pre-stored in other inference service modules; and sending the processing result to the next inference service module through the service address.

In some embodiments, each of the inference service modules has a first identifier configured to indicate an arrangement order corresponding to the inference service module; and the service address of each of the inference service modules is generated based on the first identifier corresponding to the inference service module.

It may be understood that, the above modules of the apparatus for running an inference service platform provided in some embodiments of the disclosure have functions of the corresponding blocks of the method for running an inference service platform. The functions may be achieved by hardware or by hardware executing corresponding software. The hardware or software includes one or more modules corresponding to the above functions. The above modules may be achieved by software and/or hardware. The modules may be independently achieved or integrated. The functions of modules of the apparatus for running an inference service platform may refer to corresponding description of the method for running an inference service platform, which is not repeated herein.

It should be noted that, acquisition, storage and application of user personal information involved in the technical solution of the disclosure comply with relevant laws and regulations, and do not violate public order and good customs.

According to some embodiments of the disclosure, an electronic device, a readable storage medium and a computer program product are further provided in the disclosure.

Figure 6:
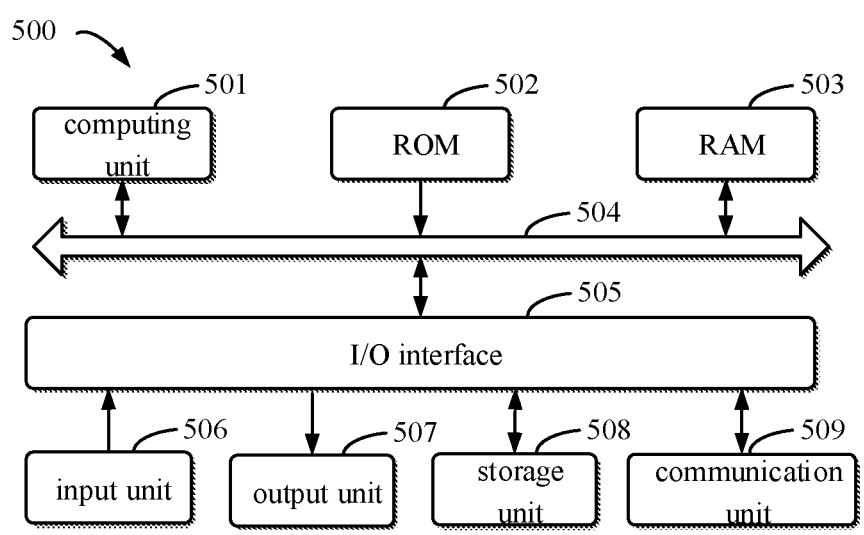
FIG. 6 illustrates a block diagram of an example electronic device configured to perform a method for running an inference service platform in some embodiments of the disclosure.

FIG. 6 illustrates a block diagram of an example electronic device configured to execute the method for running an inference service platform in some embodiments of the disclosure. Electronic devices may be intended to represent various types of digital computers, such as laptop computers, desktop computers, workstations, personal digital assistants, servers, blade servers, mainframe computers, and other suitable computers. Electronic devices may also represent various types of mobile apparatuses, such as personal digital assistants, cellular phones, smart phones, wearable devices, and other similar computing devices. The components shown herein, their connections and relations, and their functions are merely examples, and are not intended to limit the implementation of the disclosure described and/or required herein.

As illustrated in FIG. 6, a device 500 includes a computing unit 501, configured to execute various appropriate actions and processes according to a computer program stored in a read-only memory (ROM) 502 or loaded from a memory unit 508 to a random access memory (RAM) 503. In a RAM 503, various programs and data required for a device 500 may be stored. The computing unit 501, the ROM 502, and the RAM 503 are connected to each other through a bus 504. An input/output (I/O) interface 505 is also connected to a bus 504.

Several components in the device 500 are connected to the I/O interface 505, and include: an input unit 506, for example, a keyboard, a mouse, etc.; an output unit 507, for example, various types of displays, speakers, etc.; a storage unit 508, for example, a magnetic disk, an optical disk, etc.; and a communication unit 509, for example, a network card, a modem, a wireless communication transceiver, etc. The communication unit 509 allows the device 500 to exchange information/data with other devices over a computer network such as the Internet and/or various telecommunication networks.

The computing unit 501 may be various general and/or dedicated processing components with processing and computing ability. Some examples of a computing unit 501 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 501 performs various methods and processings as described above, for example, a method for running an inference service platform. For example, in some embodiments, the method for running an inference service platform may be further achieved as a computer software program, which is physically contained in a machine readable medium, such as a storage unit 508. In some embodiments, a part or all of the computer program may be loaded and/or installed on the device 500 through a ROM 502 and/or a communication unit 509. When the computer program is loaded on a RAM 503 and executed by a computing unit 501, one or more blocks in the method for running an inference service platform may be performed. Alternatively, in other embodiments, a computing unit 501 may be configured to perform a method for running an inference service platform in other appropriate ways (for example, by virtue of a firmware).

Various implementation modes of the systems and technologies described above may be achieved in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the disclosure may be written with one or any combination of a plurality of programming languages. The programming languages may be provided to a processor or a controller of a general purpose computer, a dedicated computer, or other apparatuses for programmable data processing so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), a blockchain network, and an internet.

The computer system may include a client and a server. The client and server are generally far away from each other and generally interact with each other through a communication network. The relationship between the client and the server is generated by computer programs running on the corresponding computer and having a client-server relationship with each other. A server may be a cloud server, and further may be a server of a distributed system, or a server in combination with a blockchain.

It should be understood that, various forms of procedures shown above may be configured to reorder, add or delete blocks. For example, blocks described in the disclosure may be performed in parallel, sequentially, or in a different order, as long as the desired result of the technical solution disclosed in the disclosure may be achieved, which will not be limited herein.

The above specific implementations do not constitute a limitation on the protection scope of the disclosure. Those skilled in the art should understand that various modifications, combinations, sub-combinations and substitutions may be made according to design requirements and other factors. Any modification, equivalent replacement, improvement, etc., made within the spirit and principle of embodiments of the disclosure shall be included within the protection scope of the disclosure.

The invention claimed is:

1. A method for running an inference service platform, comprising:
   determining inference tasks to be allocated for the inference service platform, wherein the inference service platform comprises two or more inference service groups, versions of the inference service groups are different, and the inference service groups are configured to perform a same type of inference services;
   determining a flow weight of each of the inference service groups, wherein the flow weight is configured to indicate a proportion of a number of inference tasks to which the corresponding inference service group need to be allocated in a total number of inference tasks; and
   allocating the corresponding number of inference tasks in the inference tasks to be allocated to each of the inference service groups based on the flow weight of each of the inference service groups; and
   performing the inference tasks by the inference service group,
   wherein, the inference service group comprises inference service modules, different inference service modules are correspondingly configured to perform different subtasks in an inference service, and
   wherein performing the inference tasks by the inference service group comprises: for each of the inference service modules:
   receiving data to be processed of a corresponding subtask in the inference service based on the inference service module, wherein, the data to be processed is a processing result generated by a previous inference service module adjacent to the inference service module, or original data of a first subtask in the inference service; and
   calculating a processing result corresponding to the data to be processed based on the inference service module, and sending the processing result to a next inference service module adjacent to the inference service module.

2. The method of claim 1, wherein, determining the inference tasks to be allocated for the inference service platform, comprises:
   determining inference tasks in a task queue of the inference service platform as the inference tasks to be allocated in response to a number of tasks in the task queue reaching a preset number;
   or, for every preset time period, determining inference tasks stored in a task queue of the inference service platform in the preset time period as the inference tasks to be allocated.

3. The method of claim 1, wherein, determining the flow weight of each of the inference service groups, comprises:
   determining a service scene corresponding to the inference service platform; and
   determining the flow weight of each of the inference service groups based on a type of the service scene.

4. The method of claim 1, further comprising:
   configuring the flow weight of each of the inference service groups in response to a weight configuration operation for each of the inference service groups; and
   associatively recording identification information of each of the inference service groups and the corresponding flow weight.

5. The method of claim 1, wherein, sending the processing result to the next inference service module adjacent to the inference service module, comprises:
   determining a service address of the next inference service module adjacent to the inference service module from the inference service modules, wherein, a service address of each of the inference service modules is pre-stored in other inference service modules; and
   sending the processing result to the next inference service module through the service address.

6. The method of claim 5, wherein, each of the inference service modules has a first identifier configured to indicate an arrangement order corresponding to the inference service module; and
   the service address of each of the inference service modules is generated based on the first identifier corresponding to the inference service module.

7. An electronic device, comprising:
   at least one processor; and
   a memory communicatively connected to the at least one processor; wherein,
   the memory is configured to store instructions executable by the at least one processor, and when the instructions are performed by the at least one processor, the at least one processor is caused to perform:
   determining inference tasks to be allocated for an inference service platform, wherein the inference service platform comprises two or more inference service groups, versions of the inference service groups are different, and the inference service groups are configured to perform a same type of inference services;
   determining a flow weight of each of the inference service groups, wherein the flow weight is configured to indicate a proportion of a number of inference tasks to which the corresponding inference service group need to be allocated in a total number of inference tasks; and
   allocating the corresponding number of inference tasks in the inference tasks to be allocated to each of the inference service groups based on the flow weight of each of the inference service groups; and
   performing the inference tasks by the inference service group,
   wherein the inference service group comprises inference service modules, different inference service modules are correspondingly configured to perform different subtasks in an inference service;
   wherein performing the inference tasks by the inference service group comprises: for each of the inference service modules:
   receiving data to be processed of a corresponding subtask in the inference service based on the inference service module, wherein, the data to be processed is a processing result generated by a previous inference service module adjacent to the inference service module, or original data of a first subtask in the inference service; and calculating a processing result corresponding to the data to be processed based on the inference service module, and sending the processing result to a next inference service module adjacent to the inference service module.

8. The device of claim 7, wherein when the instructions are performed by the at least one processor, the at least one processor is caused to perform:
determining inference tasks in a task queue of the inference service platform as the inference tasks to be allocated in response to a number of tasks in the task queue reaching a preset number;
or, for every preset time period, determining inference tasks stored in a task queue of the inference service platform in the preset time period as the inference tasks to be allocated.

9. The device of claim 7, wherein when the instructions are performed by the at least one processor, the at least one processor is caused to perform:
determining a service scene corresponding to the inference service platform; and
determining the flow weight of each of the inference service groups based on a type of the service scene.

10. The device of claim 7, wherein when the instructions are performed by the at least one processor, the at least one processor is caused to perform:
configuring the flow weight of each of the inference service groups in response to a weight configuration operation for each of the inference service groups; and
associatively recording identification information of each of the inference service groups and the corresponding flow weight.

11. The device of claim 7, wherein when the instructions are performed by the at least one processor, the at least one processor is caused to perform:
determining a service address of the next inference service module adjacent to the inference service module from the inference service modules, wherein, a service address of each of the inference service modules is pre-stored in other inference service modules; and
sending the processing result to the next inference service module through the service address.

12. The device of claim 11, wherein, each of the inference service modules has a first identifier configured to indicate an arrangement order corresponding to the inference service module; and
the service address of each of the inference service modules is generated based on the first identifier corresponding to the inference service module.

13. A non-transitory computer readable storage medium stored with computer instructions, wherein, the computer instructions are configured to cause a computer to perform:
determining inference tasks to be allocated for an inference service platform, wherein the inference service platform comprises two or more inference service groups, versions of the inference service groups are different, and the inference service groups are configured to perform a same type of inference services;
determining a flow weight of each of the inference service groups, wherein the flow weight is configured to indicate a proportion of a number of inference tasks to which the corresponding inference service group need to be allocated in a total number of inference tasks; and
allocating the corresponding number of inference tasks in the inference tasks to be allocated to each of the inference service groups based on the flow weight of each of the inference service groups; and
performing the inference tasks by the inference service group,
wherein the inference service group comprises inference service modules, different inference service modules are correspondingly configured to perform different subtasks in an inference service;
wherein performing the inference tasks by the inference service group comprises: for each of the inference service modules:
receiving data to be processed of a corresponding subtask in the inference service based on the inference service module, wherein, the data to be processed is a processing result generated by a previous inference service module adjacent to the inference service module, or original data of a first subtask in the inference service; and
calculating a processing result corresponding to the data to be processed based on the inference service module, and sending the processing result to a next inference service module adjacent to the inference service module.

14. The non-transitory computer readable storage medium of claim 13, wherein the computer instructions are configured to cause a computer to perform:
determining inference tasks in a task queue of the inference service platform as the inference tasks to be allocated in response to a number of tasks in the task queue reaching a preset number;
or, for every preset time period, determining inference tasks stored in a task queue of the inference service platform in the preset time period as the inference tasks to be allocated.

15. The non-transitory computer readable storage medium of claim 13, wherein the computer instructions are configured to cause a computer to perform:
determining a service scene corresponding to the inference service platform; and
determining the flow weight of each of the inference service groups based on a type of the service scene.

16. The non-transitory computer readable storage medium of claim 13, wherein the computer instructions are configured to cause a computer to perform:
configuring the flow weight of each of the inference service groups in response to a weight configuration operation for each of the inference service groups; and
associatively recording identification information of each of the inference service groups and the corresponding flow weight.

17. The non-transitory computer readable storage medium of claim 13, wherein the computer instructions are configured to cause a computer to perform:
determining a service address of the next inference service module adjacent to the inference service module from the inference service modules, wherein, a service address of each of the inference service modules is pre-stored in other inference service modules; and
sending the processing result to the next inference service module through the service address.

* * * * *